United States Patent
Gagnon et al.

(10) Patent No.: US 8,791,805 B2
(45) Date of Patent: Jul. 29, 2014

(54) SYSTEM AND METHOD FOR INFORMING PASSENGERS OF A PUBLIC TRANSPORT VEHICLE OF A DOOR LOCK STATUS

(76) Inventors: Mario Gagnon, Sainte-Adele (CA); Ivan Brousseau, Montreal (CA); Thomas Rouayroux, Montreal (CA)

(*) Notice: Subject to any disclaimer, the term of this patent is extended or adjusted under 35 U.S.C. 154(b) by 116 days.

(21) Appl. No.: 13/352,734

(22) Filed: Jan. 18, 2012

(65) Prior Publication Data
US 2013/0021147 A1    Jan. 24, 2013

Related U.S. Application Data

(60) Provisional application No. 61/434,135, filed on Jan. 19, 2011.

(51) Int. Cl.
*B60Q 1/00* (2006.01)
(52) U.S. Cl.
USPC .................. 340/438; 340/286.11; 340/485
(58) Field of Classification Search
USPC ......... 340/438, 433, 434, 439, 441–442, 453, 340/460, 463–464, 485, 488, 286.11, 340/815.79
See application file for complete search history.

(56) References Cited

U.S. PATENT DOCUMENTS

| | | | | |
|---|---|---|---|---|
| 4,766,696 A * | 8/1988 | Huon de Kermadec | ........ | 49/262 |
| 4,850,636 A * | 7/1989 | McLaren et al. | ........... | 296/146.5 |
| 5,683,475 A | 11/1997 | Furukawa | | |
| 6,009,668 A * | 1/2000 | Reddy | ............................. | 49/280 |
| 6,230,847 B1 * | 5/2001 | Skolnick | ....................... | 187/395 |
| 7,010,947 B2 * | 3/2006 | Milo | .............................. | 70/257 |
| 7,369,192 B2 | 5/2008 | Ambrose et al. | | |
| 8,087,738 B2 * | 1/2012 | Henriott et al. | ............ | 312/223.6 |
| 2006/0086161 A1 * | 4/2006 | Johansson | ....................... | 70/208 |
| 2007/0062085 A1 * | 3/2007 | Pan | ................................. | 40/546 |

* cited by examiner

*Primary Examiner* — Daniel Previl
(74) *Attorney, Agent, or Firm* — Norton Rose Fulbright Canada LLP (57) ABSTRACT

There is described a system and method for informing passengers of a public transport vehicle of a door lock status, the method comprising: optically coupling a light source to an at least partially see-through modesty panel for propagating light therein, the modesty panel being positioned within the transport vehicle adjacent to a door for separating the passengers from the door; receiving a signal indicating that the door is unlocked; and illuminating at least a portion of the modesty panel using the light source, thereby informing the passengers that the door is unlocked.

20 Claims, 5 Drawing Sheets

SYSTEM AND METHOD FOR INFORMING PASSENGERS OF A PUBLIC TRANSPORT VEHICLE OF A DOOR LOCK STATUS

CROSS-REFERENCE TO RELATED APPLICATIONS

The present application claims priority on U.S. patent application No. 61/434,135 filed Jan. 19, 2011, the entire contents of which is incorporated herein by reference.

TECHNICAL FIELD

The present invention relates to the field of public transport vehicles, such as buses for example, and particularly methods and systems for informing passengers of such a public transport vehicle of a door lock status.

BACKGROUND

In some public transport vehicles, such as public transport buses for example, an exit door is able to be opened by passengers and an overhead light is usually used as a visual indicator to inform the passengers that the exit door in question is unlocked and therefore that they may exit the vehicle by opening the door. For example, at a bus stop, the driver of a public bus remotely unlocks the doors, including a rear door, which causes a light above the door in question to illuminate. Upon illumination of the light, the passengers are free to open the door (such as by actuating a pneumatic door opening mechanism having a proximity sensor switch, for example) in order to exit the bus via this rear door. The light is usually of small size and located such that it is not easily visible for the passengers. For example, the light is typically positioned above the exit door and the passengers have to raise their head to look at the light in order to know whether or not they can open the door.

There is a need for an improved method and system for informing passengers about the lock status of a door in a public transport vehicle.

SUMMARY

According to a first broad aspect, there is provided a system for informing passengers of a public transport vehicle of a door lock status, the system comprising: a modesty panel positioned within the public transport vehicle adjacent a door, the modesty panel projecting inwardly from a wall of the public transport vehicle and being upstanding to separate the door from a passenger receiving area of the public transport vehicle, the modesty panel having a see-through panel body; a light source connected to a power source and optically coupled to the modesty panel for propagating light in the see-through panel body, the light source illuminating at least a portion of the see-through panel body of the modesty panel when the light source is switched on; and a controller in communication with the light source and the power source, the controller being configured to receive a signal indicative of the door lock status for the door of the public transport vehicle and control to an illumination of said at least a portion of the see-through panel body of the modesty panel as a function of the door lock status by turning on or turning off the light source, in order to inform the passengers of the door lock status.

According to a second broad aspect, there is provided a method for informing passengers of a public transport vehicle of a door lock status, the method comprising: optically coupling a light source to an at least partially see-through modesty panel for propagating light therein, the modesty panel being upstanding and positioned within the public transport vehicle adjacent to a door for separating the door from a passenger receiving area of the public transport vehicle; receiving a signal indicating that the door is unlocked; and illuminating at least a portion of the modesty panel using the light source, thereby informing the passengers that the door is unlocked.

There is further alternately provided a modesty panel assembly for a public transport vehicle, the modesty panel being operable to illuminate for informing passengers of the public transport vehicle of a door lock status, the modesty panel comprising: an at least partially see-through panel body having at least one edge thereof which allows light incident thereon to enter the panel body; a light source optically coupled to the panel body for propagating light into the panel body through said at least one edge; and at least a portion of a planar surface of the panel body being configured to allow light within the panel body to be refracted outward therefrom, said portion of the panel body thereby being illuminated by the light source when the light source propagates light into the panel body; whereby the panel body, when illuminated, informs the passengers of the public transport vehicle of the door lock status.

The expression "modesty panel" refers to a panel used as a physical and/or visual screen or barrier for providing some amount of privacy to the passengers of a public transport vehicle who are located, either seated or standing, adjacent to a door for example. Such a modesty panel may be positioned immediately adjacent to a door, for example, and may extend substantially vertically along a side of the door and have a height which substantially corresponds to a height of the door.

The expression "see-through" when used herein to characterize a material refers to a material that at least partially propagates light so that a person may at least partially see through a piece of the material. For example, a see-through panel can be an at least partially translucent panel, a semi-transparent panel, a transparent panel, or the like. It should be understood that a see-through panel can be a panel of which at least a portion or section thereof is see-through. For example, a see-through panel can comprise at least one opaque section and at least one translucent, semi-transparent, or transparent section. Alternately, the entire modesty panel may be fully translucent, semi-transparent or transparent.

BRIEF DESCRIPTION OF THE DRAWINGS

Further features and advantages of the present invention will become apparent from the following detailed description, taken in combination with the appended drawings, in which.

It will be noted that throughout the appended drawings, like features are identified by like reference numerals.

DETAILED DESCRIPTION

Figure 1:
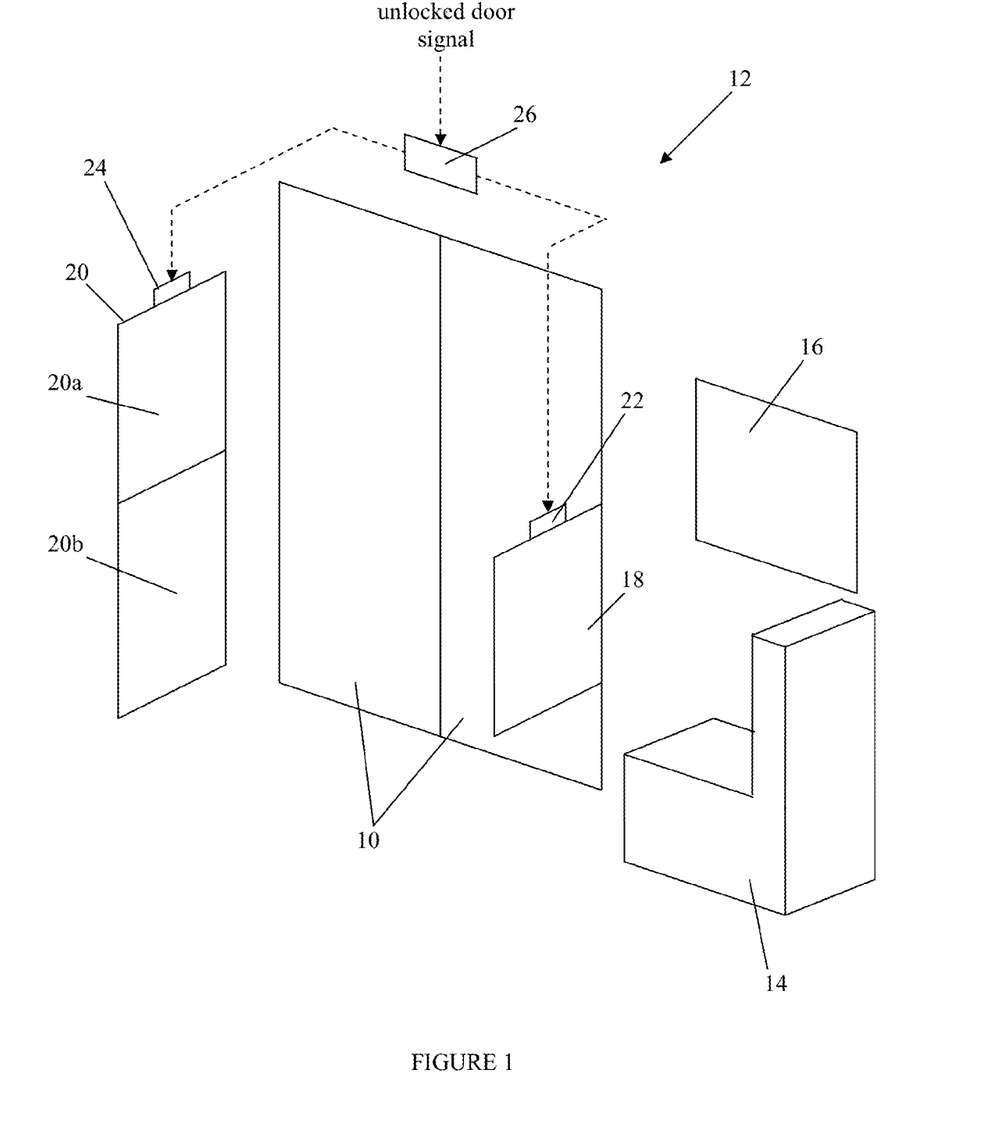
FIG. 1 schematically illustrates an indoor environment of a public transport vehicle provided with a system for informing passengers of a door lock status, in accordance with a general embodiment of the present disclosure.

FIG. 1 illustrates the indoor environment of a public transport vehicle such as a public transport bus, a metro, a tram, or the like. The transport vehicle comprises a double door 10 which can be used by passengers to exit the vehicle, a door lock status information system 12, a seat 14, and a window 16.

The door lock status information system 12 comprises two see-through modesty panels 18 and 20 positioned on opposite sides of the door 10, two light sources 22 and 24, and a controller 26. Each light source 22 and 24 is optically coupled to a respective modesty panel 18 and 20 in order to propagate light therein and illuminate at least a portion thereof. The controller 26 is connected to the light sources 22 and 24 in order to control their illumination. The controller 26 is in communication with a door lock system (not shown) which controls the locking and unlocking of the door 10. It should be understood that the door lock system may be integral with a door opening system which controls the opening and closing of the door 10. The controller 26 is adapted receive a signal indicative of the door lock status of the door 10 and illuminate the light sources 22 and 24 as a function of the door lock status.

In one embodiment, the controller 26 receives a signal indicative of the door lock status for the door 10, i.e. a door lock status signal, sent from the door lock system. The controller 26 then illuminates or not the light sources 22 and 26 as a function of the door lock status. When the door lock status signal indicates that the door is unlocked, the controller 26 switches on the light sources 22 and 24 while switching off the light sources 22 and 24 when the door lock status indicates that the door is locked. When the light sources 22 and 24 are switched on, light is generated and optically coupled into the modesty panels 18 and 20. The light coupled in the modesty panels 18 and 20 propagates at least within a portion of the modesty panels 18 and 20, which results in the illumination of at least the portion of the modesty panels 18 and 20 in which light propagates.

The illumination of the modesty panels 18 and 20 is used as a visual indicator for informing the passengers of the lock status of the door 10. When the modesty panels 18 and 20 are not illuminated, i.e. when the light sources 22 and 24 are switched off, the passengers are visually informed that the door 10 is locked. When the modesty panels 18 and 20 are illuminated, i.e. when the light sources 22 and 24 are switched on, the passengers are visually informed that the door 10 is unlocked and they may exit the vehicle. For example, when the modesty panels 18 and 20 are illuminated, a passenger may manually open the door 10. Alternatively, the public transport vehicle may be provided with a system for automatically opening the door 10. For example, a motion sensor, a touch-to-open system, push bars, or the like, that is connected to the automatic door opening system may be used for automatically opening the door 10.

The see-through modesty panels 18 and 20 are located adjacent to the door 10 on opposite sides thereof. The see-through modesty panels 18 and 20 are sized, shaped, and positioned to act as a physical/visual screen and provide privacy to the passengers located adjacent to the sides of the door 10. The see-through modesty panels 18 and 20 vertically extend along at least a section of the height of the door 10. While the modesty panel 20 extends from the floor of the public transport vehicle, other configurations are possible, as illustrated by the modesty panel 18. Similarly, while the modesty panel 18 extends from the frame of the door, other configurations are possible. For example, the modesty panel may extend from the wall of the vehicle adjacent to the frame of the door 10. A modesty panel may also be secured to the floor or ceiling of the vehicle while being spaced apart from the wall of the vehicle or the doorframe.

It should be understood that only a portion of the modesty panel can be see-through. For example, while the whole modesty panel 18 is made from see-through material such as glass, plastic, or the like, the modesty panel 20 comprises a see-through portion 20a optically connected to the light source 24 for illumination and an opaque portion 20b which does not illuminate.

In one embodiment, the modesty panel 18, 20 is positioned within the public transport vehicle to be in the visual field of passengers located adjacent to the door 10 and waiting for exiting the vehicle.

In one embodiment, the controller 26 is an electrical switch positioned along the electrical connection between the light sources 22 and 24 and a power source used for powering the light sources 22 and 24. The switch is adapted to allow the powering of the light sources 22 and 24 as a function of the door lock status signal. When the door lock status signal indicates that the door 10 is locked, the switch interrupts the powering of the light sources 22 and 24, thereby informing the passengers that the door is locked. When the door lock status signal indicates that the door 10 is unlocked, the switch allows for the powering of the light sources 22 and 24 to illuminate the modesty panels 18 and 20, thereby informing the passengers that the door is unlocked.

In another embodiment, the controller 26 comprises two optical shutters each adapted to allow or prevent light from propagating therethrough. The two optical shutters are positioned between a respective light source 22 and 24 and a respective panel 18 and 20. Each shutter receives a door lock status signal from the door lock system of the door 10 for example. When the door lock status signal indicates that the door is locked, the shutter interrupts the propagation of light from the light source 22 and 24 to its respective panel 18 and 20, thereby informing the passengers that the door is locked. When the door lock status signal indicates that the door is unlocked, the shutter opens to allow light to be coupled from the light source 22 and 24 to its respective modesty panel 18 and 20 in order to illuminate the respective modesty panel 18 and 20 and therefore inform the passengers that the door is unlocked.

In a further embodiment, the controller 26 comprises a memory and a processing unit configured for receiving a door lock status signal, determine from the door lock status signal whether the light sources 22 and 24 have to be illuminated, and send a command signal to the power source for switching on or off the light sources 22 and 24. Upon determination by the processing unit that the light sources 22 and 24 have be illuminated, the processing unit sends a command signal to the power source indicating that the light sources 22 and 24 have to be switched on. Upon determination by the processing unit that the door 10 is locked and the light sources 22 and 24 must not be illuminated, the processing unit sends a command signal to the power source indicating that the light sources 22 and 24 have to be switched off. It should be understood that the controller 26 may directly control the power source used for powering the light sources 22 and 24 and illuminate the light sources 22 and 24 by switching on and off the power source. In another example, the controller 26 controls at least one electrical switch connected between the power source and the light sources 22 and 24. In a further example, the controller 26 controls the opening of two shutters each positioned between a respective light source 22 and 24 and a respective modesty panel 18 and 20 in order to control the illumination of the modesty panels 18 and 20.

In one embodiment, the door lock status signal is an electrical signal of which the amplitude of the voltage or intensity is modulated in time for encoding the door lock status therein. For example, a first predetermined voltage value may indicate that the door is locked while a second and different predetermined voltage indicates that the door is unlocked. It should be understood that the door lock status signal may be any adequate type of signal that may have the door lock status encoded therein. For example, the door lock status signal can be an optical signal of which the amplitude is modulated for encoding the door lock status therein, a Radio Frequency (RF) signal of which the amplitude is modulated for encoding the door lock status therein, or the like. In this case, the controller 26 is further adapted to determine the door lock status by decoding the information encoded into the received door lock status signal.

The light sources 22 and 24 are adequately positioned with respect to their respective modesty panel 18 and 20 in order to propagate light therein. For example, the light sources 22 and 24 may be in physical contact with their respective modesty panel 18 and 20 to propagate light therein. In another example, the light sources 22 and 24 may be remotely located with respect to their respective modesty panels 18 and 20 and an optical waveguide such as an optical fiber may be used for propagating the light from the light source 22, 24 to the modesty panel 18, 20. An optical coupling device such as a lens, a diffuser, or the like may also be used for improving the coupling of light from the light source 22, 24 or the optical waveguide to the modesty panel 18 and 20.

The modesty panel 18 and the portion 20*a* of the modesty panel 20 are made from a material which allows a passenger to at least partially see therethrough. For example, they may be made from glass, plastic, or the like.

The light sources 22 and 24 may be any adequate light sources that emit an adequate quantity of light for illuminating at least a portion of a modesty panel. For example, the light source 22, 24 may be a laser, a light-emitting diode (LED), a gas discharge lamp, or the like.

While FIG. 1 illustrates two see-through modesty panels 18 and 20 each provided with a respective light source 22 and 24 to act a visual indicator for informing passengers of the door lock status, it should be understood that other configurations are possible as long as at least one see-through modesty panel optically coupled to a light source is positioned adjacent to a door. For example, a door of a public transport vehicle may be provided with a single see-through modesty optically coupled to a light source for informing passengers of the door lock status. In another example, the door may be provided with more than one modesty panel of which a single one is see-through and optically coupled to a light source. In a further embodiment, the door is provided with two see-through modesty panels which are each optically coupled to a same light source for illuminating the two modesty panels. While FIG. 1 illustrates a single light source 22, 24 optically coupled to a respective modesty panel 18, 20, a plurality of light sources may be optically coupled to a same modesty panel for illuminating the modesty panel.

Figure 2:
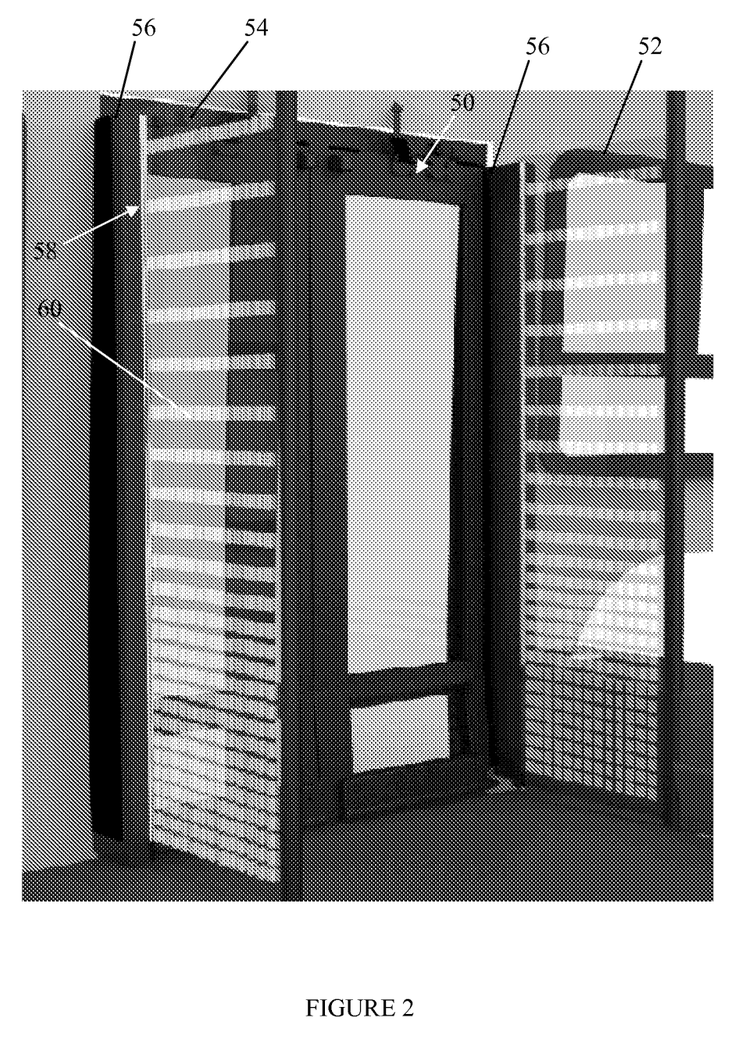
FIG. 2 illustrates a pair of see-through modesty panels having de-polished regions for diffusing light, in accordance with a first particular embodiment of the present system for informing passengers of a door lock status.

FIG. 2 illustrates the internal environment of a transit bus comprising a double door 50 that may be open by passengers. Two see-through modesty panels 52 and 54 extend from the frame 56 of the door 50 on opposite sides of the door 50. The modesty panels 52 and 54 extend substantially from the floor of the transit bus along substantially the entire height of the door 50.

Green LEDs 58 are integrated into the doorframe 56 along the height of the door 50 in order to couple green light into the modesty panels 52 and 54 via the edge of the modesty panels 52 and 54 inserted into the doorframe 56. The illumination of the green LEDS 58 is controlled by a controller (not shown) as a function of the lock status of the door 50 which is received by the controller from the door lock system for example.

In one embodiment, the modesty panels 52 and 54 are made from polished glass or clear polycarbonate, and sections 60 of the lateral surfaces of the modesty panels 52 and 54 are depolished. The light coupled into the modesty panels 52 and 54 by the LEDs 58 propagates into the modesty panels 52 and 54, and part of the propagating light is diffused by the depolished sections 60 of the lateral surfaces of the modesty panels 52. As a result, light is emitted by the depolished sections 60 which appear illuminated for the passengers in addition to the illumination of the edge of the modesty panels 52 and 54 through which light is coupled.

Figure 3:
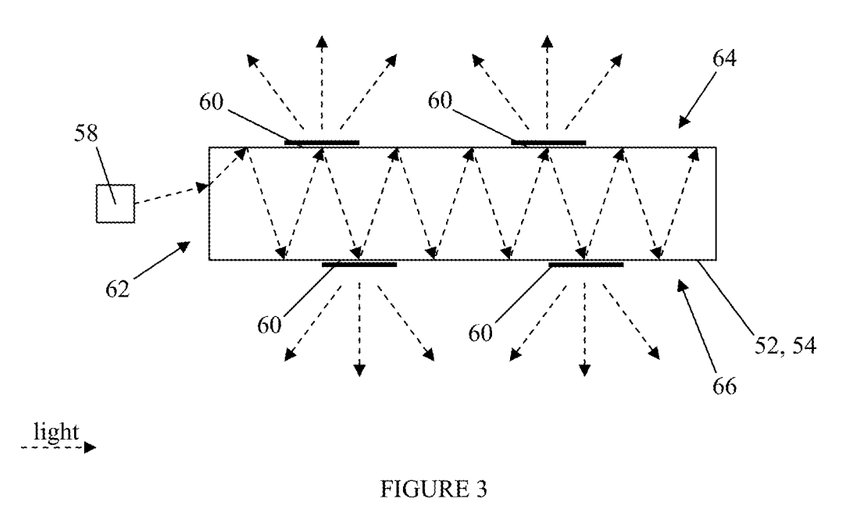
FIG. 3 schematically illustrates the propagation of light in the see-through modesty panel of FIG. 2.

FIG. 3 schematically illustrates the propagation of light (dashed line) within the modesty panels 52 and 54 and their illumination. Light emitted by the LED 58 is coupled into the modesty panel 52, 54 through the edge 62 of the modesty panel 52, 54 inserted into the doorframe and facing the LED 52. The coupled light propagates within the modesty panel 52, 54 which is provided with depolished sections 60 on its lateral surfaces 64 and 66. While the polished sections of the surfaces 64 and 66 are smooth and reflect substantially all of the light propagating in the modesty panel 52, 54, the surface of the depolished sections 60 is irregular. Therefore, when encountering a depolished section 60, part of the light propagating within the modesty panel 52, 54 is refracted outside the modesty panel 52, 54. As a result, the depolished sections 60 diffuse light and appear illuminated for passengers.

While the depolished sections 60 use their irregular surface to diffuse light, it should be understood that other methods for locally diffusing light may be used. For example, the refractive index of the lateral surfaces 64 and 66 may be locally varied at sections 60 in order to diffuse light out of the modesty panel 52, 54. In another example, the lateral surfaces 64 and 66 of the modesty panel 52, 54 may be entirely polished and a diffusing film may be deposited on the lateral surfaces 64 and 66 at sections 60 for diffusing light out of the panel 52, 54. In yet another alternate embodiment, etching and/or engraving of the surfaces of the panel 52,54 may be used to form the portions of the panel that will appear illuminated when light is propagated within the panel, rather than using only surface depolished regions as described above.

Figure 4:
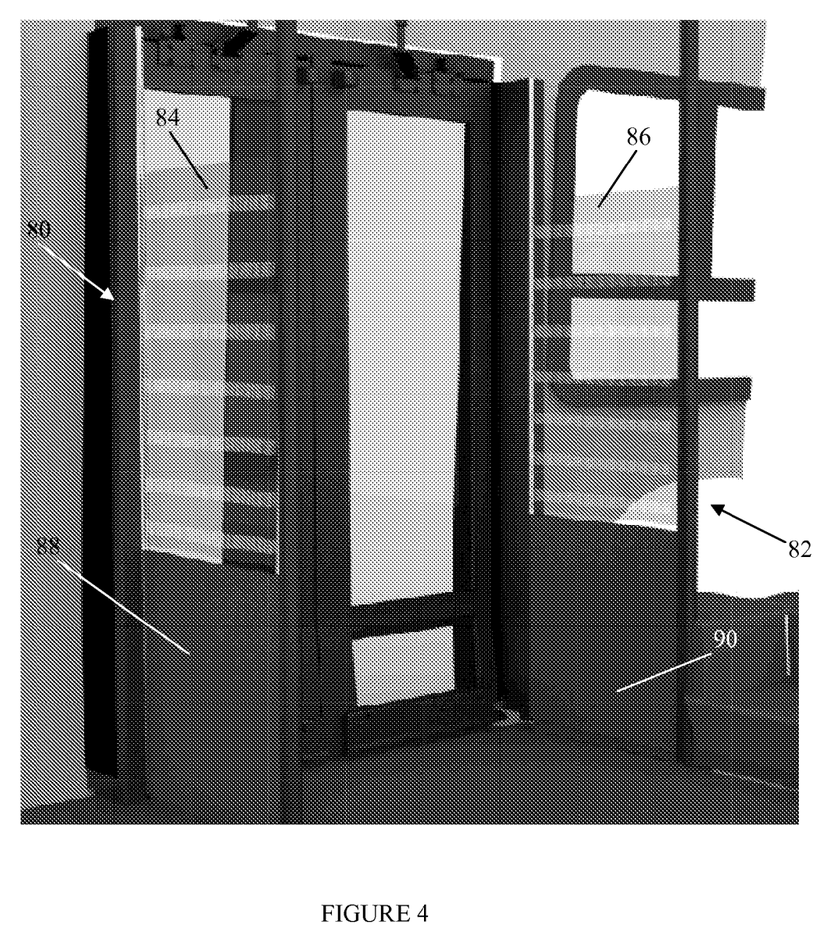
FIG. 4 illustrates a pair of see-through modesty panels having de-polished regions for diffusing light in accordance with a second particular embodiment of the present system for informing passengers of a door lock status.

FIG. 4 illustrates modesty panels 80 and 82 each comprising a see-through section 84 and 86, respectively, and an opaque section 88 and 90, respectively. The opaque section 88 and 90 extends vertically from the floor of the vehicle and the see-through section 84 and 86 extends vertically on top of its respective opaque section 88 and 90. The see-through section 84 and 86 is located within the visual field of a passenger standing in front the door.

While, in the present description, it is separate from a see-through modesty panel, the light source coupled to the see-through modesty panel may be integral with the see-through modesty panel. For example, the see-though modesty panel may be a see-through liquid crystal display (LCD), a transparent LED display such as a see-through organic LED display, or the like. It should also be understood that the see-through modesty panel may also be a translucent, semi-transparent, or transparent projection screen on which light is projected.

While the present description refers to the non-illumination of a see-through modesty panel for informing passengers of a public transport vehicle that a door is locked, it should be understood that the see-through modesty panel may be illuminated when the door is locked and unlocked using different colors for indicating the door lock status. For example, green light sources may be used for illuminating the see-through modesty panel for informing passengers that the door is unlocked while red light sources may illuminate the see-through modesty panel when the door is locked. In this case, the controller is adapted to control the illumination of the different color light sources as a function of the door lock status.

Figure 5:
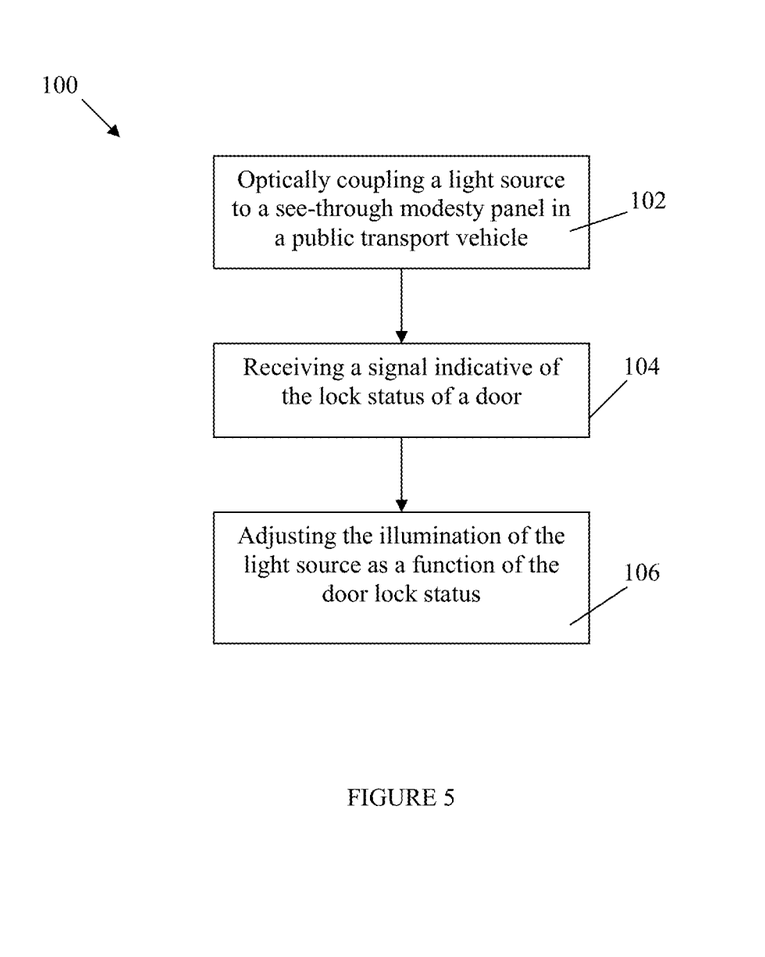
FIG. 5 is a flow chart illustrating a method for informing passengers of a public transport vehicle of a door lock status, in accordance with a general embodiment of the present disclosure.

FIG. 5 illustrates one embodiment of a method 100 for informing passengers of the lock status of a door in a public transport vehicle. At step 102, a light source is optically coupled to a see-through modesty panel positioned adjacent to the door of the vehicle for illuminating the modesty panel. Any adequate method for optically coupling the light source of the see-through modesty panel may be used, as described above.

At step 104, a signal indicative of the lock status of the door is received and the illumination of the light source is adjusted as a function of the door lock status at step 106.

Any adequate method for controlling the illumination of a light source may be used as described above. For example, the powering of the light source may be controlled. In another example, an optical shutter may be used for controlling the illumination of the light source.

In one embodiment, the light source is switched on when the received signal indicates that the door is unlocked and switched off when the received signal indicates that the door is locked.

In another embodiment, a first light source emitting light of a first color, such as green for example, is switched on when the received signal indicates that the door is unlocked, and a second light source emitting light of a second and different color, such as red for example, is switched on when the received signal indicates that the door is locked.

It should be understood that the above described system and method for informing passengers of the lock status of a door may be used in any adequate public transport vehicle such as a tram, a transit bus, an intercity bus, a metro, or the like.

The embodiments of the invention described above are intended to be exemplary only. The scope of the invention is therefore intended to be limited solely by the scope of the appended claims.

The invention claimed is:

1. A system for informing passengers of a public transport road vehicle of a door lock status, the system comprising:
   a modesty panel positioned within the public transport road vehicle adjacent a door, the modesty panel projecting inwardly from a wall of the public transport road vehicle and being upstanding to separate the door from a passenger receiving area of the public transport road vehicle, the modesty panel having a see-through panel body;
   a light source connected to a power source and optically coupled to the modesty panel for propagating light in the see-through panel body, the light source illuminating at least a portion of the see-through panel body of the modesty panel when the light source is switched on; and
   a controller in communication with the light source and the power source, the controller being configured to receive a signal indicative of the door lock status for the door of the public transport road vehicle and to control an illumination of said at least a portion of the see-through panel body of the modesty panel as a function of the door lock status by turning on or turning off the light source, in order to inform the passengers of the door lock status.

2. The system as claimed in claim 1, wherein the controller is operable to switch on the light source to thereby illuminate said at least a portion of the see-through panel body of the modesty panel when a first signal indicating that the door is unlocked is received, thereby visually informing the passengers that the door is unlocked.

3. The system as claimed in claim 2, wherein the controller prevents the illumination of said at least a portion of the see-through panel body of the modesty panel upon reception of a second signal indicating that the door is locked, in order to visually inform the passengers that the door is locked.

4. The system as claimed in claim 3, wherein the controller switches on the light source when said first signal is received and switches off the light source when the second signal is received.

5. The system as claimed in claim 3, wherein the controller comprises one or more optical shutters adapted to selectively allow or prevent light from the light source to propagate therethough.

6. The system as claimed in claim 5, wherein the optical shutters are operable by the controller to permit light from the light source to reach the see-through panel body of the modesty panel when the first signal is received and to prevent the light from the light source from reaching the see-through panel body of the modesty panel when the second signal is received.

7. The system as claimed in claim 1, further comprising a door lock system of the public transport road vehicle in communication with the controller, the door lock system being operable to lock and unlock the door and to generate the signal indicative of the door lock status.

8. The system as claimed in claim 1, wherein the see-through panel body of the modesty panel has at least one edge thereof which allows light incident thereon to enter the panel body, the light source being optically coupled such as to propagate light into the panel body though said at least one edge, and wherein the see-through panel body includes a planar surfacing having said at least a portion of the see-through panel body which allows light within the panel body to be refracted outward therefrom thereby illuminating said portion of the see-through panel body.

9. The system as claimed in claim 8, wherein the portion of the panel body configured to allow light to be refracted outward therefrom is a de-polished section of the see-through panel body.

10. The system as claimed in claim 8, wherein a refractive index of the panel body varies across the planar surface thereof to permit greater diffusion of light from said portion of the modesty panel illuminated by the light source.

11. The system as claimed in claim 10, wherein the planar surface of the panel body includes a surface finish thereon permitting said greater diffusion of light in said portion, the surface finish comprising at least one of a diffusing film, etching and engraving.

12. The system as claimed in claim 8, wherein the panel body is partially opaque in a region thereof outside said portion of the panel body illuminated by the light source.

13. A public transport road vehicle comprising the system for informing passengers of the public transport road vehicle of the door lock status as defined in claim 1.

14. A method for informing passengers of a public transport road vehicle of a door lock status, the method comprising:
- optically coupling a light source to an at least partially see-through modesty panel for propagating light therein, the modesty panel being upstanding and positioned within the public transport road vehicle adjacent to a door for separating the door from a passenger receiving area of the public transport road vehicle;
- receiving a signal indicating that the door is unlocked; and
- illuminating at least a portion of the modesty panel using the light source, thereby informing the passengers that the door is unlocked.

15. The method as claimed in claim 14, further comprising:
- receiving a signal indicating that the door is locked; and
- switching off the light source to darken the modesty panel, thereby informing the passengers that the door is locked.

16. The method as claimed in claim 14, further comprising providing a controller in communication with the light source to control the operation thereof, the controller receiving the signal indicating that the door is unlocked and allowing the light source to reach the modesty panel when said signal is received.

17. The method as claimed in claim 16, further comprising using the controller to switch on the light source when said signal indicating that the door is unlocked is received.

18. The method as claimed in claim 16, further comprising using the controller to operate one or more optical shutters adapted to allow or prevent light from the light source to propagate therethrough.

19. The method of claim 18, further comprising using the optical shutters to permit the light source to reach the modesty panel when the signal indicating that the door is unlocked is received and to prevent the light source from reaching the modesty panel when the door is locked.

20. The method as claimed in claim 16, further comprising providing a door lock system in communication with the controller, the door lock system generating said signal indicating that the door is unlocked.

\* \* \* \* \*